(12) United States Patent
Doss et al.

(10) Patent No.: US 8,452,631 B2
(45) Date of Patent: May 28, 2013

(54) KEEPING WORKING HOURS AND CALENDAR ENTRIES UP-TO DATE

(75) Inventors: J. Smith Doss, Raleigh, NC (US); Renee M. Kovales, Cary, NC (US); Diane P. Pozefsky, Chapel Hill, NC (US); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2770 days.

(21) Appl. No.: 10/245,156

(22) Filed: Sep. 17, 2002

(65) Prior Publication Data

US 2004/0064567 A1 Apr. 1, 2004

(51) Int. Cl.
*G06Q 10/00* (2012.01)
(52) U.S. Cl.
USPC .......................................... 705/7.18
(58) Field of Classification Search
USPC ............................................ 705/9, 7.18
See application file for complete search history.

(56) References Cited

U.S. PATENT DOCUMENTS

| 5,828,882 | A | * | 10/1998 | Hinckley | 719/318 |
|---|---|---|---|---|---|
| 5,855,006 | A | * | 12/1998 | Huemoeller et al. | 705/9 |
| 5,899,979 | A | * | 5/1999 | Miller et al. | 705/9 |
| 6,101,480 | A | * | 8/2000 | Conmy et al. | 705/9 |
| 7,191,731 | B2 | | 3/2007 | Cote | |
| 7,461,378 | B2 | * | 12/2008 | Beyda | 719/313 |
| 2001/0042001 | A1 | * | 11/2001 | Goto et al. | 705/9 |
| 2001/0049617 | A1 | * | 12/2001 | Berenson et al. | 705/8 |
| 2002/0131565 | A1 | * | 9/2002 | Scheuring et al. | 379/88.19 |
| 2003/0154116 | A1 | | 8/2003 | Lofton | |
| 2003/0182394 | A1 | | 9/2003 | Ryngler et al. | |
| 2004/0109025 | A1 | * | 6/2004 | Hullot et al. | 345/764 |
| 2006/0173919 | A1 | | 8/2006 | Owen Rees et al. | |
| 2008/0147567 | A1 | | 6/2008 | Perry et al. | |
| 2009/0063557 | A1 | | 3/2009 | MacPherson | |

FOREIGN PATENT DOCUMENTS

WO 00/67436 11/2000

OTHER PUBLICATIONS

Tempus Fugit: http://researchweb.watson.ibm.com/people/j/jussi/papers/TF/CIKM2001.pdf.
The Virtual Assistant: http://www.research.ibm.com/MobileComputing/VirtualAsst.html.
Russell Information Sciences brings the first real-time scheduling solution to the World Wide Web, May 19, 1997, Business Wire, p05191091, Dialog File 16, 2 pages.
Vaillancourt, Sue, Russell Information Sciences announces Calendar Manager Version 5.0 for Macintosh, Jun. 5, 1995, PR Newswire, New York, Section 1, p. 1, 2 pages.

(Continued)

*Primary Examiner* — Andre Boyce
(74) *Attorney, Agent, or Firm* — Marcia L. Doubet

(57) ABSTRACT

Techniques are disclosed for keeping calendars up-to-date, whereby a person's working hours, events, and actual availability are accurately reflected. In response to user-generated input and/or application-generated input, working hours can be updated and calendar events can be added to, deleted from, or changed on the user's calendar. This makes it easy for users to keep calendars (including working hours) up-to-date and helps both people and applications that use calendar data. Profiles are preferably used to specify working hours, and a particular user may have one or more profiles available (including a default profile); the user can then easily select from among these profiles to update the working hours for a date/day, or a range of dates/days. Preferences may be associated with the profiles, providing a convenient way of isolating information that applies only to a particular set of working hours.

5 Claims, 13 Drawing Sheets

OTHER PUBLICATIONS

J. Smith Doss et al., U.S. Appl. No. 11/926,059, filed Oct. 28, 2007, Office Action, Jun. 23, 2010, 7 pages.
J. Smith Doss et al., U.S. Appl. No. 12/610,288, filed Oct. 31, 2009, Office Action, Jul. 7, 2010, 6 pages.
J. Smith Doss et al., U.S. Appl. No. 11/926,059, filed Oct. 28, 2007, Office Aciton, Nov. 19, 2010, 10 pages.

* cited by examiner

FIG. 10

Calendar Preferences

| Basics | Profile 1 | Profile 2 | Profile 3 | Profile 4 | Profile 5 |

Identify working hours and preferences for this profile.

☒ This is my Default Profile

Working Hours:
- ☐ Sunday
- ☒ Monday     7:30 AM - 5:00 PM
- ☒ Tuesday    7:30 AM - 5:00 PM
- ☒ Wednesday  7:30 AM - 5:00 PM
- ☒ Thursday   7:00 AM - 3:30 PM
- ☒ Friday     7:00 AM - 3:30 PM
- ☐ Saturday Default working time zone: Eastern Standard Time ▼

Preferences
- Name   Data
- Pager  555-1212

[OK] [Cancel]

FIG. 12

Preferences

Working Hours and Preferences

Identify working hours and preferences for these dates

From: 07/16/2002  1230
To: 07/16/2002  1240

Working Hours:
- ☐ Sunday
- ☐ Monday
- ☒ Tuesday  — 8:00 AM - 2:00 PM
- ☐ Wednesday
- ☐ Thursday
- ☐ Friday
- ☐ Saturday

1210

Preferences

| Name | Data |
|------|------|
| Cellphone | 123-4567 |

1220

☐ Override Any Current Preferences
1250

OK
Cancel

KEEPING WORKING HOURS AND CALENDAR ENTRIES UP-TO DATE

RELATED INVENTIONS

The present invention is related to the following commonly-assigned U.S. Patents: U.S. Pat. No. 6,988,128, titled "Calendar Events and Calendar-Driven Application Technique" (Ser. No. 09/670,844); U.S. Pat. No. 6,640,230, titled "Calendar-Driven Application Technique for Preparing Responses to Incoming Events" (Ser. No. 09/671,001); U.S. Pat. No. 7,035,865, titled "Calendar-Enhanced Awareness for Instant Messaging Systems and Electronic Status Boards" (Ser. No. 09/941,045); U.S. patent application Ser. No. 10/245,200 (filed concurrently herewith), titled "Predicting and Adjusting Users' Working Hours and Electronic Calendar Events"; and U.S. patent application Ser. No. 10/245,174 (filed concurrently herewith), titled "Context Conflict Resolution and Automatic Context Source Maintenance". The disclosures of these related inventions are hereby incorporated herein by reference.

BACKGROUND OF THE INVENTION

1. Field of the Invention

The present invention relates to computer systems, and deals more particularly with methods, systems, and computer program products for keeping electronic calendars up-to-date automatically and dynamically.

2. Description of the Related Art

Calendars, and electronic calendars in particular, often contain a wealth of information about their owner. For example, an individual may use an electronic calendar to maintain information about his work schedule, his meetings and other appointments, his vacation and business travel plans (including when he will be away, which flights or other transportation he will use, where he can be reached while away, who he may visit while away, etc.), phone calls that need to be made at particular times, and so forth. Examples of electronic calendar systems include Microsoft Outlook® 2000 and Lotus Notes®. ("Outlook" is a registered trademark of Microsoft Corporation, and "Lotus Notes" is a registered trademark of Lotus Development Corporation.)

Electronic calendars may be accessed by people and/or by applications. Calendar data can be used to automate tasks and to inform others about things such as whether the calendar owner is currently available, or is out of the office on business, and so forth. For example, the related invention titled "Calendar Events and Calendar-Driven Application Technique" (U.S. Pat. No. 6,988,128) uses calendar data to automate voice mail greetings, among other things. It does this by analyzing calendar data, including a person's scheduled working hours and other scheduled events. The related invention titled "Calendar-Enhanced Awareness for Instant Messaging Systems and Electronic Status Boards" (U.S. Pat. No. 7,035,865) discloses techniques whereby calendar data is used as input to instant messaging ("IM") systems and electronic status boards. With the increasing use of calendar data such as disclosed in these related inventions, it becomes more important to keep calendar data up to-date and accurate.

Prior art electronic calendars known to the inventors allow the calendar owner to specify a fixed set of working hours, such as 9 a.m. to 5 p.m. Monday through Friday. A user can also specify multiple sets of working hours for a day (such as 7 a.m. to 11 a.m. and 12 noon to 4 p.m. on Thursdays). These specified working hours are then applied to the user's entire calendar, and cannot be set individually for a particular date. That is, there is no way for a calendar user to specify that for next Monday, his working hours are 10 a.m. to 6 p.m., without setting the working hours to 10 a.m. to 6 p.m. for all Mondays. This inability to precisely control working hours is a limitation of existing electronic calendars.

Previously-stored data in existing calendar systems may also become corrupted or inaccurate if a user attempts to change his working hours. This is because electronic calendar data is used for multiple purposes: one is to predict the future (e.g., showing where the user will be on a particular day) and another is to record the past (e.g., to determine how many hours a department's employees spent in meetings for a given time period). For example, a calendar owner "Joe" may have normal working hours of 7 a.m. to 3:30 p.m. Suppose Joe needs to work off-shift for some period of time, for example to cover for a co-worker who is sick or on vacation. With current systems, if Joe temporarily changes his working hours from 7 a.m. to 3:30 p.m. Monday through Friday, setting them instead to 3:30 p.m. to 11 p.m. Sunday through Thursday, this change affects not only the working hours for the future, but also those of the past. Any predictions based on working hours must be reformulated and information derived by analyzing historical calendar data may be incorrect because of the altered working hours. Existing calendar systems provide no way to indicate that one set of working hours is valid for one date or time frame, but not for the remaining dates or time frames, whether in the past or in the future. The invalidity that after-the-fact changes to working hours may introduce for historical calendar data, and for analyses that may be performed on that data, is a serious problem.

Note that in some cases, events scheduled on a user's calendar appear as a type of temporary change to a user's working hours, due to late arrival or early departure. For example, if Joe has a dentist appointment in the morning and will therefore arrive at work an hour late, his calendar will likely have an event such as "personal business" scheduled until his expected arrival time. However, these events are not actually represented on electronic calendars as changes to the calendar owner's working hours, but instead are events scheduled during the working hours.

No existing calendar systems are known that support temporarily lengthening a user's working hours. If Joe's normal schedule is to arrive in the office at 9 a.m., but on a particular day he arrives at 8 a.m., any accesses to his calendar data during that extra hour will provide incorrect information about Joe's availability unless Joe brings up the calendar software and changes his working hours. For example, suppose Joe's manager wishes to speak to him to get a status update before she attends a 9 a.m. meeting. If the manager checks Joe's calendar that morning to see if Joe is available before the meeting begins, she will find that Joe is not scheduled to be at work yet—even though he actually is working—and on the basis of the inaccurate information, will mistakenly assume that Joe is not available. If the automated voice mail system takes an incoming call to Joe's number and uses Joe's calendar data to generate a message for the caller, the caller will be incorrectly informed that Joe will not be at work until 9 a.m. rather than that he stepped away for the moment.

The same problem happens if Joe decides to work late occasionally. Even though he is in the office, his calendar will indicate otherwise. A caller trying to reach Joe will be informed, based on his calendar data, that Joe has already left for the day, when in fact he may have just stepped out of the office for a moment. In some cases, this is merely a nuisance. On the other hand, if someone needs to locate Joe for an important business matter or for a personal emergency, the incorrect information can have significant consequences.

There may also be situations where a person does not know in advance what his hours will be on a given day. Suppose that Joe intends to work until his normally-scheduled end-of-day, which is represented on his calendar, but his wife calls saying she is stuck in traffic and that Joe needs to leave immediately to pick up the children from daycare. Joe doesn't take the time to start up his calendar software and change his working hours: he just logs off of his computer and leaves the office. Since his calendar has not been updated with his early departure information, any co-workers looking at the entries on his calendar will think that he is still at work. Additionally, any calendar-based tools (such as those that derive automated voice mail greetings from the calendar) will also be using incorrect data. This incorrect status information can lead to false expectations that voice mail or other types of messages left for Joe will be received and responded to that day, when in fact Joe is no longer at work.

A similar problem occurs for events that do not have a predetermined start time. For example, many people do not have a specific lunch time; they might take half an hour for lunch, anywhere between 11 a.m. and 1 p.m. Given the randomness of the start time, many users do not schedule their lunch break on their calendar. Therefore, accurate information about the user's status during this period cannot be ascertained by calendar-based applications, and people viewing the user's calendar entries also do not get accurate information.

Another problem with existing calendar systems is that a user's status information may be set in multiple places, where those places are not linked to the calendar. For example, a person may update her status in her instant messaging system, her status for an electronic status board application, her status for an e-mail message server, and so forth. If a user logs on to her IM client or e-mail client, for example, the client software is aware of the user's presence. The user may make explicit changes to her status in one or more places, such as by setting her IM status to "Away" instead of "Active". If the user has to manually make status updates in multiple places, it is not only tedious but also an inefficient use of time and is error prone. Users will likely miss some of the places that should be revised, either due to accidental oversight or because they choose to spend their time on other things. As a result, the user's status information will be inaccurate in some systems and inconsistent in general.

Improved techniques are needed for keeping calendars, including working hours, up-to-date and for synchronizing calendar status with other status-aware systems.

SUMMARY OF THE INVENTION

An object of the present invention is to provide improved techniques for keeping calendars, including working hours, up-to-date.

An additional object of the present invention is to provide techniques for programmatically adding, deleting, and/or changing calendar entries to keep a user's calendar up-to-date.

Another object of the present invention is to provide improved techniques for synchronizing calendar status with other status-aware systems.

A further object of the present invention is to provide techniques that enable users to more conveniently and accurately maintain consistent status information.

Still another object of the present invention is to provide techniques that enable calendar users to easily and accurately specify variations to their working hours.

Another object of the present invention is to provide this working hour variation capability in a manner that maintains the integrity of historical and future calendar events and/or other calendar data.

Yet another object of the present invention is to make electronic calendars more useful.

A further object of the present invention is to increase the accuracy of information available from electronic calendars.

Other objects and advantages of the present invention will be set forth in part in the description and in the drawings that follow and, in part, will be obvious from the description or may be learned by practice of the invention.

To achieve the foregoing objects, and in accordance with the purpose of the invention as broadly described herein, the present invention provides systems, methods, and computer program products for keeping working hours and calendar entries up-to-date. In one aspect, this technique comprises: defining, for a calendar user, one or more sets of working hours for the user's calendar; flexibly setting working hours for the user on specific days; and dynamically modifying the user's working hours and calendar events to update the user's calendar data.

The modifications may be triggered by user-initiated actions, such as signaling a working hours change from a graphical user interface or from any input device.

Or, the modifications may be triggered by application-initiated notifications. These application-initiated notifications may be generated responsive to an application detecting the user's status, or a change in the user's status, including the user's presence or absence. The user may be prompted to confirm modifications or may be notified of modifications that will result from application-initiated notifications, in which case the modifications are preferably suppressed if the user so indicates.

Each set of working hours for the user is preferably stored in a user profile. The technique may further comprise allowing the user to select one of his stored profiles, and programmatically applying the working hours from the selected profile to the user's calendar.

Optionally, user preferences may be associated with the user profile.

For current and future dates, the working hours and preferences for that date are preferably stored and determined in one of three different ways: (1) if the user explicitly specified working hours and/or preferences for that day, then those working hours and/or preferences are stored and used; (2) if the user has specified a profile name for that day, then that profile name is stored and the working hours and preferences specified in that profile are used; and (3) if no working hours or profile are specified for that day, then no working hours or preference information is stored and the working hours and preferences from the default profile are used.

For past dates, profile names are not stored so that a future change in the definition of a profile will now change the information that was applicable at the time. The following data is preferably stored: (1) scheduled working hours, determined as described in the previous paragraph; (2) actual working hours, representing last-minute, real-time changes due to user and/or application input; and (3) preferences, determined as described in the previous paragraph.

The updates to the user's calendar data preferably comprise changing the user's scheduled working hours and calendar events. The modifications for the user may comprise a notification that the user's working status is changed, in which case the updates further comprise updating the user's calendar to reflect the changed working status. The working status change may comprise the particular user arriving at work early, in which case the updates preferably further comprise extending the user's starting work hour to coincide with receiving the notification. The working status change may comprise the user leaving work early, in which case the updates preferably further comprise reducing the user's ending work hour to coincide with receiving the notification. The working status change may comprise the user attending an event (e.g., going to lunch), in which case the updates preferably further comprise scheduling a calendar event on the user's calendar for the duration of the event. The duration of the event may be a default duration, which may be determined by consulting a stored rule, or the duration may be specified by the user. The working status change may comprise the user staying at work late, in which case the updates preferably further comprise extending the user's ending work hour for a duration of time the user will work late. The duration of time may be specified by the user, or a default value may be used to determine the duration of time. The working status change may comprise the user indicating that he is available, in which case the updates preferably further comprise setting an ending time of any currently-scheduled events to coincide with receiving the notification.

Optionally, rules may be used to determine how to perform the updates to the user's calendar.

Modifying the working hours may further comprise specifying, by the user, different working hours for one or more days, and programmatically applying the different working hours to the user's calendar for the specified day or days.

In another aspect, the techniques of the present invention comprise (1) defining one or more sets of working hours for a user's calendar; (2) specifying, by the user, different working hours for one or more days; and (3) programmatically applying the different working hours to the user's calendar for the specified day or days. Each of the sets of working hours may be stored in a user profile, in which case the specifying preferably comprises enabling the user to select one of his profiles. This aspect may further comprise programmatically adding, changing, or deleting events on the user's calendar, responsive to status notifications for the user.

Techniques of the present invention may also be used advantageously in various methods of doing business. For example, a calendar system providing the advantageous features disclosed herein may be marketed to users under various revenue models, including monthly subscriptions (or other periodic subscriptions), pay-per-use, etc.

The present invention will now be described with reference to the following drawings, in which like reference numbers denote the same element throughout.

BRIEF DESCRIPTION OF THE DRAWINGS

FIGS. 10-13 depict GUI panels that illustrate aspects of preferred embodiments.

DESCRIPTION OF PREFERRED EMBODIMENTS

Figure 1:
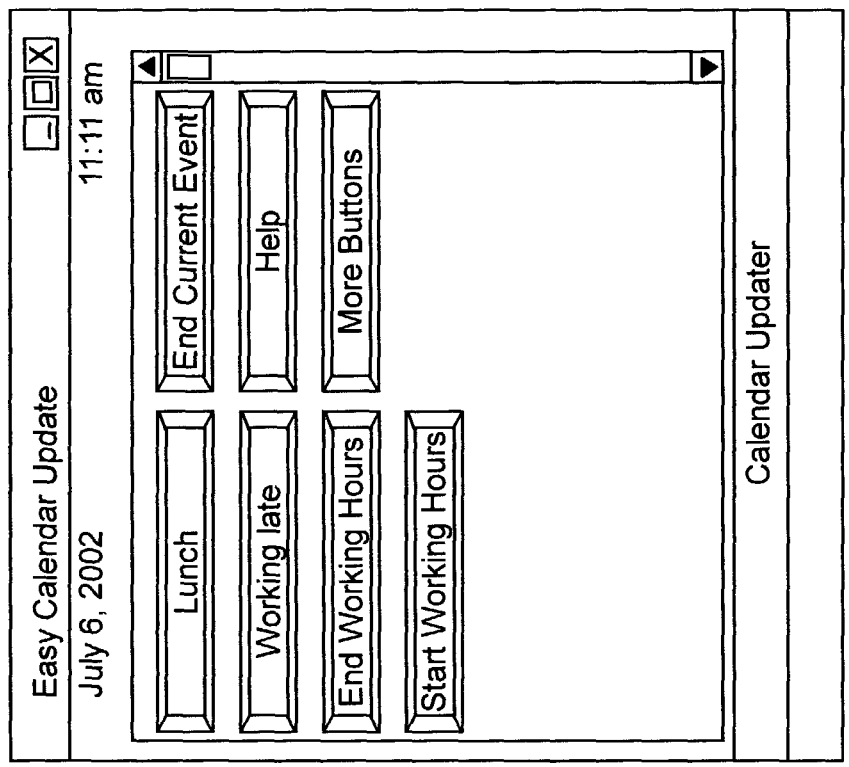
FIG. 1 provides a sample graphical user interface ("GUI") display for a utility with which a user may signal updates that dynamically affect the working hours on his calendar and his calendar events, according to an embodiment of the present invention.

The present invention defines improved techniques for keeping calendars up-to-date, whereby a person's working hours and actual availability are accurately reflected. Working hours can be conveniently changed, without triggering a reformulation of future calendar events and without corrupting historical calendar events. These changes may be in response to user-generated input and/or application-generated input. When user-generated and/or application-generated input is supported, a person is able to have his current status information reflected consistently among applications and on his calendar without having to make changes in multiple places, saving the person time as well as providing a more accurate view of his availability. The improved accuracy reflected in the user's calendar will be of benefit to other users viewing his calendar as well as to other systems that analyze or process calendar data.

The term "calendar data", as used herein, refers to information of the type used by electronic calendars. In preferred embodiments, this information comprises calendar entries (referred to equivalently herein as "calendar events") as well as other information such as the calendar owner's working hours, the time zone for a particular calendar, and user preferences. User preferences may be used to indicate how a particular calendar owner's calendar entries should be interpreted, such as the user's preferred mode of contact (e.g., by phone, by pager, etc.) during various types of scheduled events.

According to preferred embodiments, working hours information is stored using a profile, and a user may have more than one of these profiles if multiple sets of working hours have been specified. A profile also allows the user to specify multiple sets of working hours for each day (such as 7 a.m. to 11 a.m. and 12 noon to 4 p.m. on Thursdays). In addition, a particular profile may specify different sets of working hours for different days (such as 7 a.m. to 11 a.m. and 12 noon to 4 p.m. on Tuesdays, 6 a.m. to 12 noon on Wednesdays, and 12 noon to 6 p.m. on Thursdays). For example, suppose a user "Mary" works in a rotating pattern of different hours and days. The techniques disclosed herein enable Mary to define one profile to represent one set of hours and days, and another profile for a different set of hours and days. (Or, Mary can define one profile that represents the different hours for each day, if applicable.) Mary can then apply a profile to a range of dates and easily switch from one profile to another as needed. Optionally, user profiles may provide additional profile-specific data. Suppose, for example, that user Joe does not carry a pager while he is working his normal first shift schedule, but does need to carry a pager while he is working second shift to cover for his sick/vacationing co-worker. User profile data can be used to specify that the pager is a means of contacting Joe during these working hours, and also to specify the pager's phone number. This approach provides a convenient way of isolating information that applies only to a particular set of working hours.

According to preferred embodiments, a user's stored working hours and profiles interact as follows. First, each user has at least one profile, and when multiple profiles are defined, one of them is the default profile. Each profile specifies working hours (including time zone) and may optionally specify preferences. If a user changes the contents of her default profile, or selects a different profile to be her default, then that profile information is valid for today (starting at the current time) and any future date. In preferred embodiments, historical calendar data is not modified by changing the default profile. Preferred embodiments also allow a user to specify that a particular profile is to be applied to a date or a range of dates, and/or to specify working hours and preferences (as a type of override to the active profile, without explicitly changing the profile itself) for a date or a range of dates. (Refer to the discussion of FIGS. 10-13, below, for examples of how the GUI for specifying this information may be presented.) When the user specifies a different profile, the active profile is overridden, and the specified information is stored persistently for use with the calendar system. A name or other identifier of the profile may also be stored. (Preferably, when the default profile is active, its name is not explicitly stored with this information.) By storing only the profile name/identifier for current/future dates, any changes the user might make to the applicable profile can be applied efficiently (i.e., rather than having to search for and modify working hours on each individual day/days). In preferred embodiments, when the calendar rolls over to a new day (or perhaps at another appropriate time, such as the user's end of working day), information is stored pertaining to the user's scheduled working hours and preferences for the just-finished day (or working day, respectively).

Preferred embodiments also allow the user to specify a different profile, or to specify an override comprising different working hours and/or preferences, to be applied to a date (or range of dates) in the past. In this case, the scheduled working hours and preferences, as well as the actual working hours and preferences, are preferably stored persistently.

When storing information about calendar events, preferred embodiments store the information as specified on the calendar as well as any real-time corrections made after that. Suppose, for example, that a user of the present invention returns 30 minutes early from a meeting and presses a button on a GUI to indicate that she is now available (or that she otherwise indicates this status information). Her calendar will then keep the original ending time of the meeting, as well as the new ending time (which is set programmatically to the current time, as described in more detail below). If the meeting event was cancelled as a result of this button being pressed, then that information is also preferably stored.

As mentioned earlier, related U.S. Pat. No. 6,988,128 (Ser. No. 09/670,844) discloses techniques for analyzing information in calendar entries. This analysis is performed in response to an incoming event, such as an incoming e-mail message or voice message or a request for project management status information. A response is programmatically generated, using the calendar data of the person to whom the event is directed. U.S. Pat. No. 6,640,230 (Ser. No. 09/671,001) teaches preprocessing calendar events, creating a table or other repository having entries that represent a calendar owner's distinct types of status within a particular time period. Upon receiving an incoming event, this stored data can be inspected to determine an appropriate programmatic response. A combination of on-demand (i.e., event-driven) generation and preprocessing may also be used, for example, to verify that previously-generated information is still current.

In either case, the enhancements to calendar data disclosed herein enable the programmatically-generated responses used in these two related inventions to accurately accommodate variations in working hours and to automatically reflect status changes that are triggered by notifications from status-aware applications.

U.S. Pat. No. 7,035,865 (Ser. No. 09/941,045) discloses enhancements to an advanced calendar system whereby instant messaging systems and electronic status boards are preemptively notified of status changes for a defined set of users, and whereby recipients of status information can request retransmission and optionally acknowledge receipt thereof. While this related patent updates the user's application status based on notifications of calendar updates, the application-initiated updates of the present invention work in the opposite direction. That is, notifications according to the present invention flow from an IM system or electronic status board (or other status-aware application) toward the calendar system, for use in updating the calendar data. (Note that while references herein describe these notifications as coming from an application, this is for purposes of illustration and not of limitation. The notifications might also or alternatively be received from a server or service, such as an IM server or a service such as a cellular phone service that has knowledge of a user's presence.)

The manner in which preferred embodiments operate will now be described.

One way in which a user's working hours and calendar events may be updated is by explicit input from the user, as mentioned earlier. This approach is illustrated in FIG. 1, which shows a sample utility or tool panel 100 that has a selection of graphical buttons with which the user can signal updates. In this example, buttons have been provided to allow the user to signal several common reasons for altering working hours or other calendar events. An implementation of the present invention may provide additional, fewer, or different choices, and these choices may be provided using means other than graphical buttons on a utility tool panel. For example, the user's input might be enabled via icons in a toolbar, or by specially-designated function keys, choices from a pop-up or pull-down menu, and so forth. Alternatively, a Web page, a portlet, a voice-activated response system, an input device such as a telephone that transmits dual-tone multi-frequency ("DTMF") tones, or other suitable mechanism having communications capability might be used for conveying status updates, rather than a desktop application.

The choices provided in the sample panel of FIG. 1 will be described in more detail below, with reference to the flowchart in FIG. 9.

Figure 2:
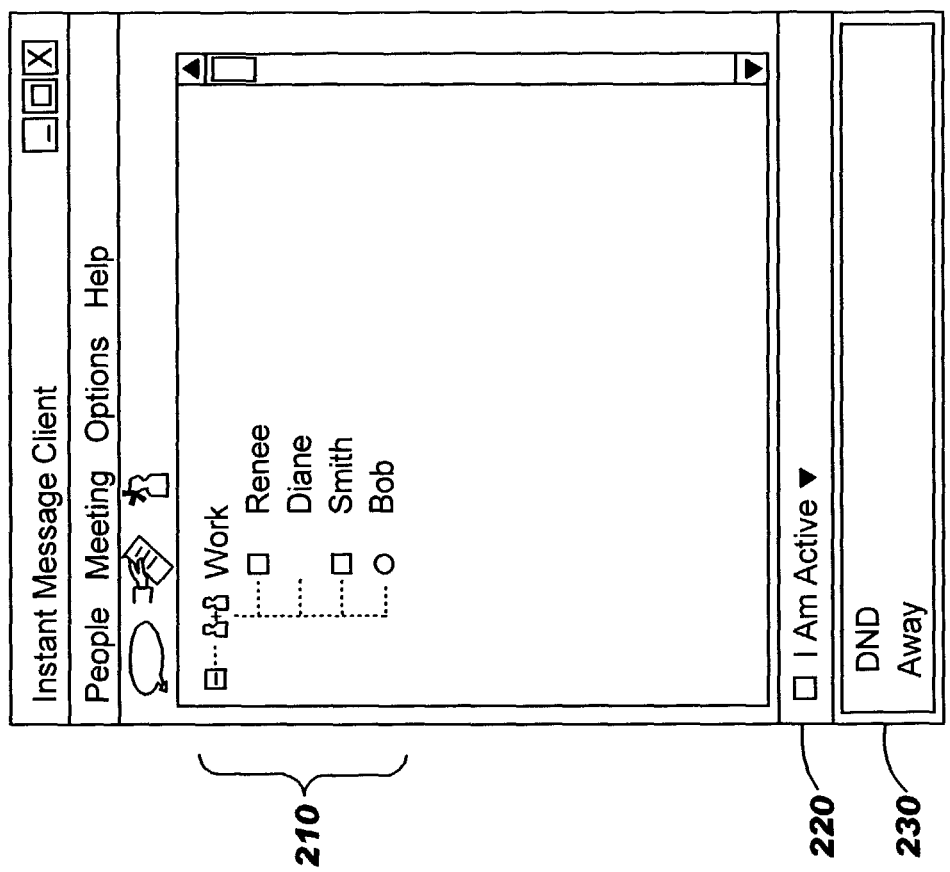
FIG. 2 provides a sample GUI display of an application from which a user's status changes are automatically made available for dynamically updating the user's calendar, according to an embodiment of the present invention.

An alternative or additional way in which a user's working hours or calendar events may be updated is in response to input from a status-aware application, as illustrated in FIG. 2. This example represents the display 200 of an IM client, where members of the user's work group are identified at 210 and graphical symbols and colors are used (as in the prior art) to indicate the IM status of each user. The current IM status for the person using this IM client is "active", as shown at 220. A drop-down list may be activated by the user to change her IM status, and as shown in the example at 230, choices of "DND" (for "do not disturb") and "Away" may be selected.

Note that while prior art IM clients allow users to change their IM status, the present invention leverages this status change information in a novel way to automatically keep the user's calendar and working hours up-to-date, as appropriate. The manner in which this is accomplished is described in more detail below.

Any application that provides a presence service may be used as an alternative to the IM client shown in FIG. 2. Or, if desired, nearly any application can be used to provide application-initiated updates at a coarse level of granularity, whereby the acts of invoking (or logging on to) the application, exiting (or logging off of) the application, and performing interaction via the keyboard can be used as limited forms of presence cues. E-mail clients, for example, may be a useful means for determining these types of changes to a user's present status. Another example is attorney time-keeping systems, with which a user presses keys to signal the system to start or stop tracking billable time and other activity. According to preferred embodiments, a user will designate one or more applications that are central to their daily activities, and notifications may be sent from these applications (hereinafter referred to as the user's designated applications) to indicate the user's presence. Preferably, users will designate applications that are used each day, throughout the day. Thus, for example, if a user normally logs onto her e-mail client immediately upon arrival to work, and leaves the e-mail client running until she leaves the office, then the e-mail client might be one of this user's designated applications. It may be useful to designate more than one application, for example to account for application outages. So, if the user has designated her e-mail client and her portal page, her presence can still be detected if she continues working with one of the applications during an outage or shutdown of the other.

Figure 3:
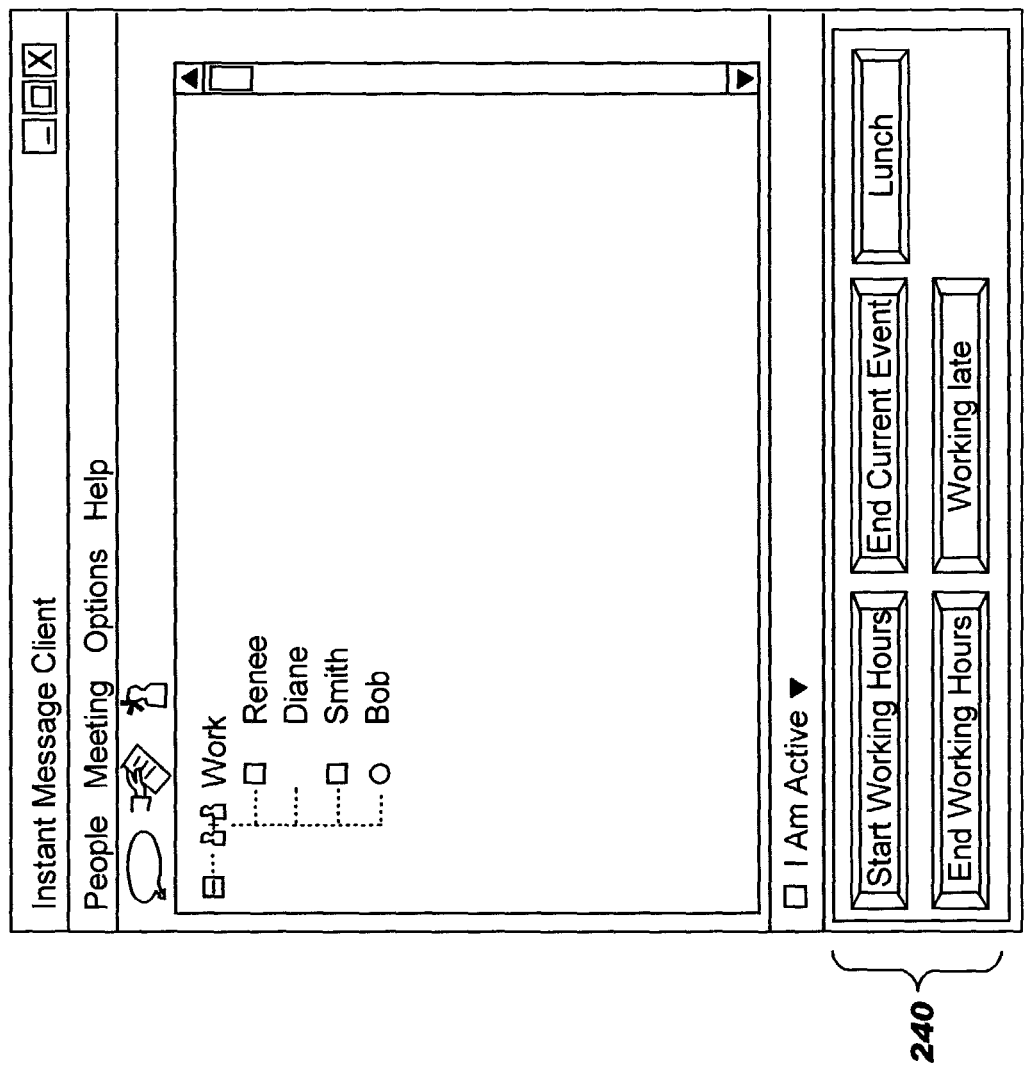
FIG. 3 shows an example of an application that makes the user's status changes automatically available for updating his calendar, and which also enables the user to explicitly request changes to the working hours on his calendar and his calendar events, according to an embodiment of the present invention.

Optionally, a status-aware application such as the IM client in FIG. 2 may be modified to support explicit user-initiated status changes of the type illustrated in FIG. 1. This combined function is illustrated in FIG. 3, where the IM client display 200' now includes a selection of graphical buttons 240.

An application such as the utility shown in FIG. 1 may also be used to generate automated notifications of status changes, if desired. As discussed above, assuming that the user has to invoke the utility or log in to a system providing the utility, this act can be interpreted as signaling the user's availability. Similarly, exiting the application or logging off of the system can be interpreted as the user becoming unavailable. When status updates are used to infer changes to the calendar, the user may optionally be prompted to confirm these interpretations.

The user may also be prompted to provide additional information after pressing buttons such as those shown in FIG. 1. For example, if the user presses the "Lunch" button, indicating that he is now leaving for lunch, he might be prompted to specify how long he will be gone.

Prompting for additional information may be used with the application-initiated changes illustrated by FIG. 2. For example, suppose the user changes her IM status to DND. A pop-up window or other type of prompt might be displayed to ask the user how long she expects this status to last. Then, the user's calendar data can be modified to show that she is not available until that time period has expired. Or, when the user exits her IM client application, she might be prompted to specify whether a particular status change is now appropriate (including "busy", "gone for the day", etc.). It may happen that application exit occurs for reasons unrelated to the user's status, such as when the user's computing device is rebooted; prompting the user is therefore a convenient way to avoid making unnecessary changes to the calendar data. A particular implementation may choose to use other means for notifying the user of a detected status change (and a corresponding impending change to the calendar data), such as contacting the user via her pager number. This approach allows the user to be notified even though she might not be at her computer or might be using an application in which a pop-up-type notification would not catch her attention. Some notifications may occur upon expiration of a timer, as described in more detail below, and the delay that such timers introduce may increase the likelihood that the user is not at her computer when the notification occurs.

Figure 4:
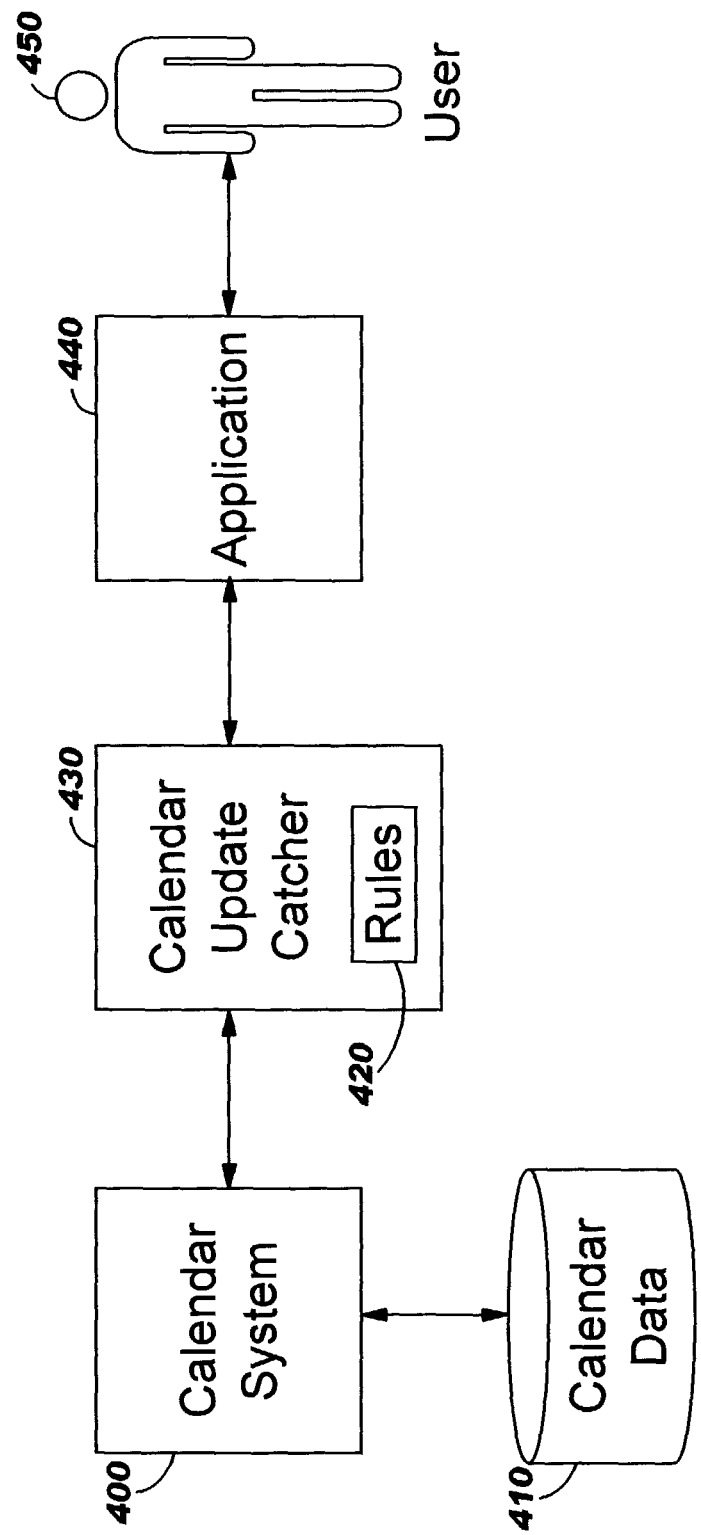
FIG. 4 illustrates components used in one embodiment of the present invention.
Figure 7:
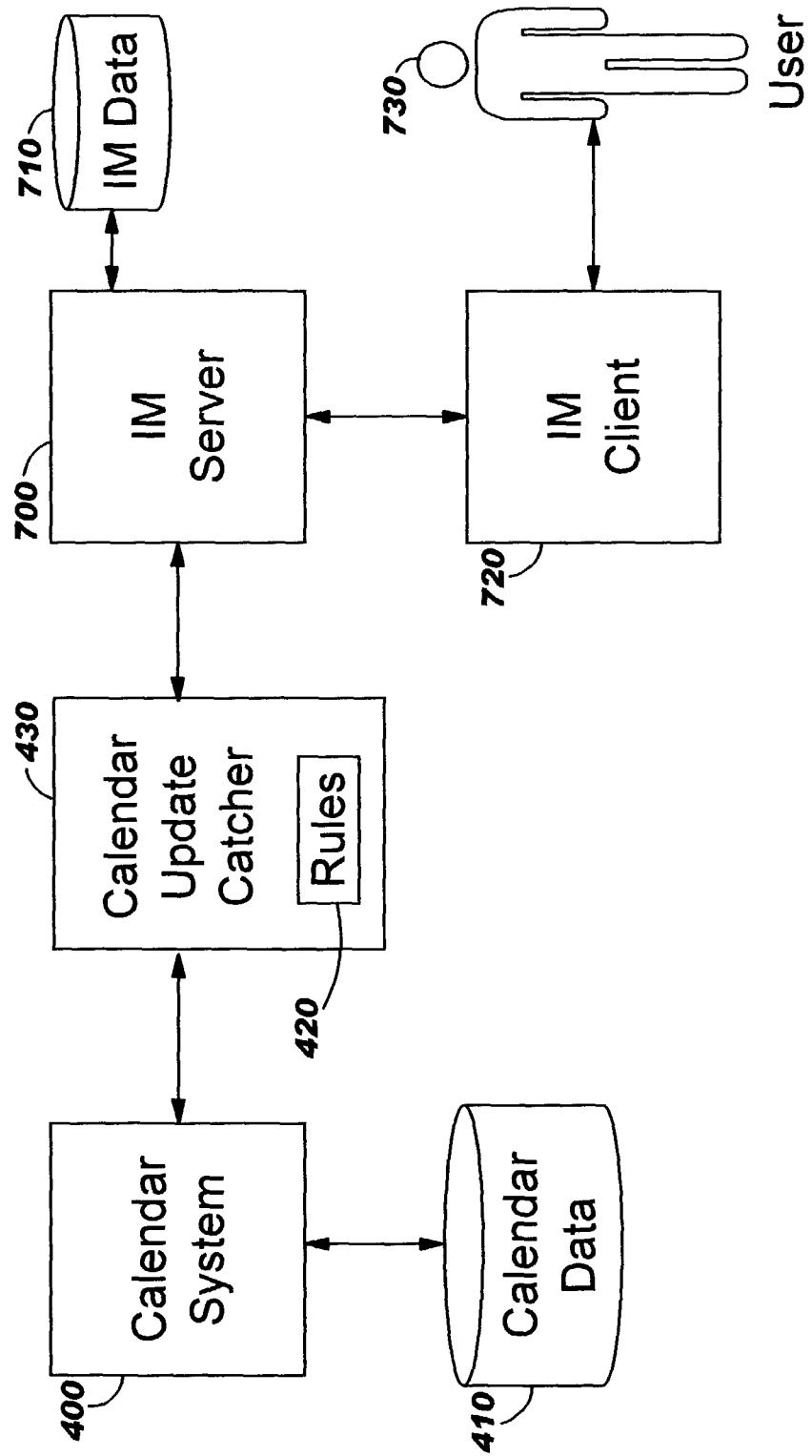
FIG. 7 illustrates components used in another embodiment of the present invention.

In preferred embodiments, a component which is referred to herein as a "calendar update catcher", or simply "catcher", receives the user-initiated notifications of status changes as well as application-initiated notifications. This catcher is then responsible for processing the notifications to determine whether the user's calendar data should be updated, and for making the updates if so. FIG. 4 illustrates a high-level view of the components present in the user-initiated scenario, and FIG. 7 illustrates components in the application-initiated scenario (including cases where the application also allows user-initiated changes).

Turning to FIG. 4, a user 450 interacts with a utility or other software application 440 to signal that he wants to update his working hours or other calendar data. For example, the user might press a "Start Working Hours" button to indicate that he's starting work for the day, or "Lunch" to indicate that he is leaving his office to go to lunch. The application 440 interacts with the user if further detail is required, and is configured to communicate these updates to the catcher 430. (The notifications to the catcher may be supplied from a server or service, in addition to or instead of an application, as stated above and illustrated in FIG. 7.) A "push" approach may be used, whereby the notifications from application 440 are sent to the catcher 430 automatically. Or, a "pull" approach may be used, whereby the catcher 430 queries the application to determine whether any updates are available. In this latter case, polling may be done periodically or a request can be made in response to an event (such as a request for a user's current status). Upon receiving updated information, the catcher interacts with the calendar system 400 to retrieve and update calendar data 410 accordingly. (Preferably, the updates are sent to the calendar system, which then modifies the stored calendar data. Alternatively, the catcher may be allowed to directly update the calendar data.) Optionally, embodiments of the present invention may be adapted for leveraging rule-based processing, in which case rules 420 are also used and optionally updated. Use of rules when processing updates is described in more detail below.

Although FIG. 4 shows the catcher 430 as a separate component from calendar system 400, these components might alternatively be integrated. However, using separate components as illustrated enables more flexibility in deploying the components, whereby the catcher may be installed on a different server than the calendar system. Use of separate servers may be important for systems that must service a high volume of user traffic, avoiding a processing bottleneck that might occur in an integrated approach. It should also be noted that there is not necessarily a one-to-one mapping between calendar systems and catchers: one catcher may work with multiple calendar systems, or one calendar system may work with multiple catchers.

The inputs available to the catcher preferably include calendar data (i.e., calendar entries as well as additional information such as working hours, including the applicable time zone), rules (where these rules may be defined by an organization and/or by each individual user), the current date and time, the input and possibly related information from an application and/or user actions, and timer expiration information.

Timers are especially useful, in combination with rules, for resolving events that may be otherwise ambiguous. For example, if the user exits a program, it may be useful to determine whether anything should be inferred about the user's status based on exiting the program: the exit might occur at the end of the user's working day, from which it could be inferred that he is leaving; or, the exit might just mean that the user doesn't want to use this program right now. For example, a timer could be started upon exiting the program, and rules such as the following could be used to resolve the ambiguity:

"If I have not logged back in within 10 minutes, assume I have left for the day."

"If it is within 15 minutes of my ending work time, assume I have left for the day."

"If my IM status is set to "Offline", wait 30 minutes before making updates to my calendar."

Rules may be used to tailor operation of the present invention for a company, an organization, or an individual. Optionally, an "Update Rules" button may be provided on the GUI shown in FIGS. 1 and 3, when user input is allowed. (In preferred embodiments, techniques of the prior art are used to create and revise the rules. Examples of rules were described above with reference to timers.)

Rules are also preferably used, rather than "hard-coded" information, to determine how state-based changes should impact the user's calendar and/or to determine how the state information is to be interpreted in combination with button pushes. For example, a rule might specify that if a user's IM status changes from DND to active, any DND event currently scheduled on the user's calendar should be cancelled. Or, if the user's IM status is DND and the user presses a "Lunch" button for updating her calendar, a rule might specify that any DND event currently scheduled for this user should continue for at least the default lunch duration.

Figure 5:
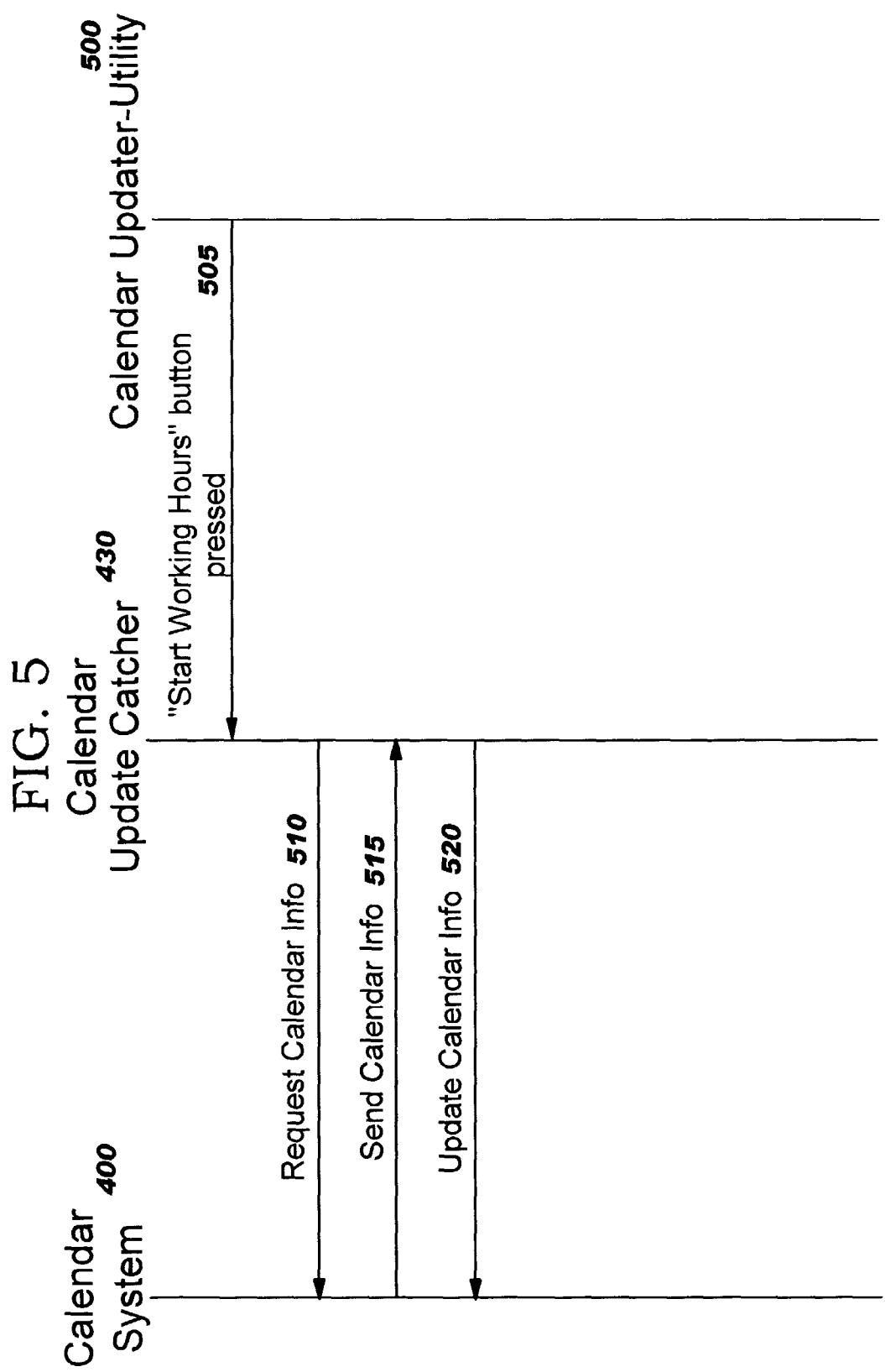
FIGS. 5 and 6 depict sample message flows occurring when a user explicitly requests changes to the working hours on his calendar and his calendar events, according to an embodiment of the present invention.

Returning to the discussion of user-initiated updates, FIG. 5 depicts sample message flows and is used to illustrate interactions among components when a user explicitly requests changes to his working hours and calendar events. For this example, it is presumed that the user is interacting with a utility such as that illustrated in FIG. 1, although another input technique may alternatively be used. Upon receiving a notification 505 that the user pressed a "Start Working Hours" button provided by the utility 500, the catcher 430 sends a message 510 to the calendar system 400, requesting this user's current calendar information. The current calendar information may include, but is not limited to, one or more of the following: some number of calendar events, including current calendar events and possibly near-term events (e.g., events for the next hour, or the next event today); working hours; the time zone; and a user identifier. The calendar system sends that information 515, and the catcher makes updates as appropriate and returns the updated actual information 520 to the calendar system. (Note that the scheduled information, such as scheduled working hours, is not changed.)

In an alternate embodiment, the catcher 430 could retrieve and cache calendar information for a user or for multiple or all users. This data could then be used throughout the day, eliminating the need for repeated requests for calendar information (e.g., message flow 510). Techniques are known in the art for keeping cached data up-to-date, and such techniques are preferably leveraged when using this alternate embodiment. In yet another alternate embodiment, the catcher might request updates (again, for a user, for multiple users, or for all users) at periodic intervals to refresh the cached data, where these intervals may be specified using configuration data. For example, the catcher might retrieve calendar data for all users every 2 hours.

Figure 6:
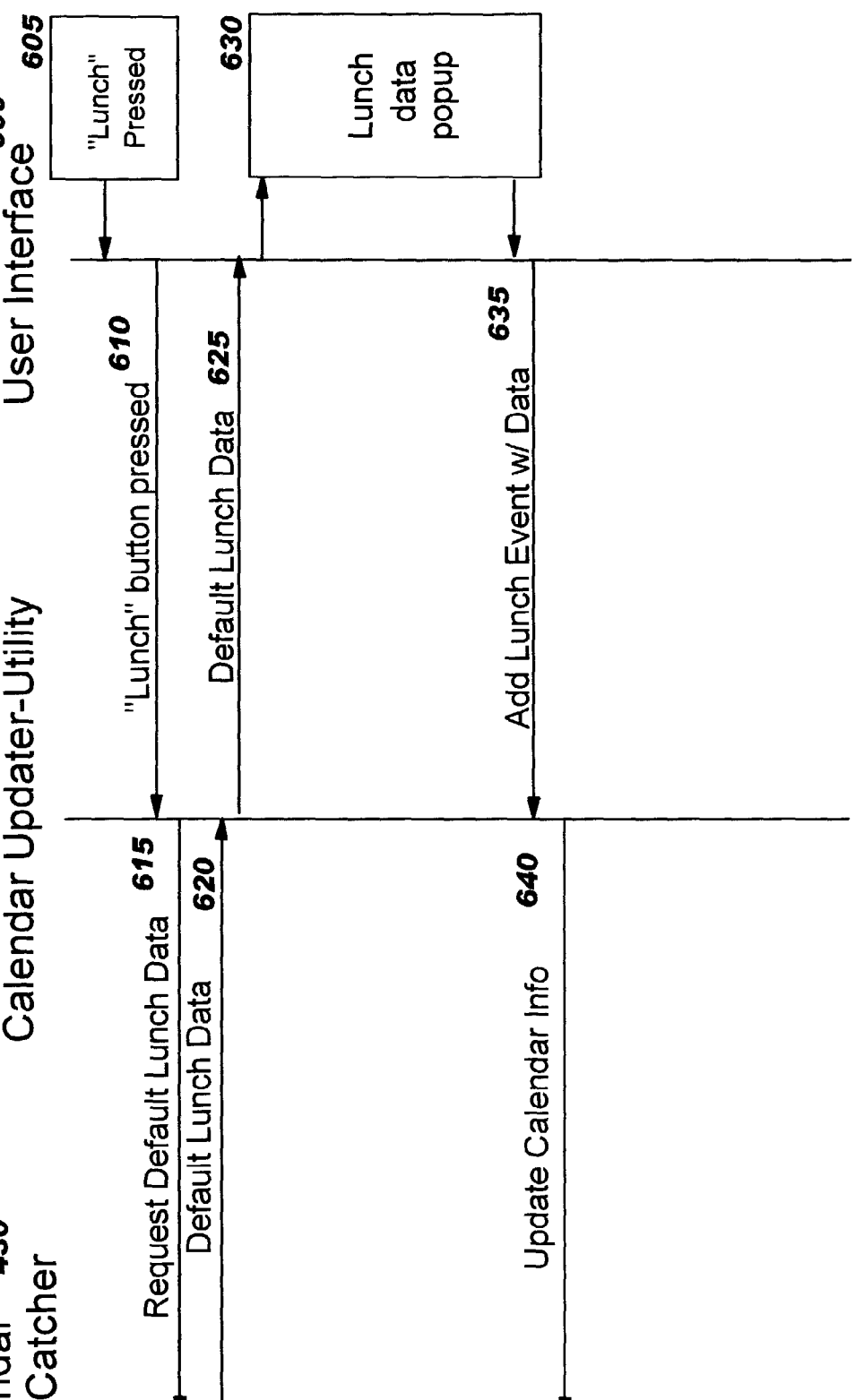

FIG. 6 illustrates actions of the user interface, in relation to the catcher. A user interface 600 of a calendar update application or utility 500, such as that depicted in FIG. 1, may contain a button (or other means) for the user to indicate that he is leaving for lunch. Upon pressing this button 605, a signal 610 is sent to the utility. An implementation of the calendar update utility may be adapted for displaying data to users and receiving user input, relying on the catcher to interpret and otherwise process the data and input. Or, an implementation of the utility may offload some of this processing from the catcher. This latter case allows the utility to service intermediate items, such as responding when the user presses a "Help" button, prompting the user for event durations and optionally validating that information, and so forth. The message flows depicted in FIG. 6 represent a utility that provides this type of offload processing.

The utility responds by sending a request 615 to the catcher 430, asking for the user's default lunch data. The catcher retrieves that information from the rules 420 and returns a response 620 to the utility, which forwards it 625 to the user interface mechanism. A pop-up or other display means 630 then preferably allows the user to view the default information. When the user's input is provided, the user interface mechanism sends it 635 to the utility, which then sends message 640 to the catcher. The update of the calendar then preferably occurs as described with reference to FIG. 5.

FIG. 7 illustrates components used in an embodiment where updates are triggered by status-aware applications (or by users via a GUI of these applications). A client-server model is used in this embodiment, where a status-aware client communicates with a server, and that server then communicates with the catcher. (In the embodiment depicted in FIG. 4, on the other hand, the user application communicates directly with the catcher.) A user 730 interacts with a status-aware application 720, which in this example is an IM client. Upon detecting a change in the user's status, the IM client 720 notifies the IM server 700, which maintains information about client states in an IM data repository 710. The catcher 430 obtains information from the IM server about updates to a user's current status, either by direct notification or by query, as described above for FIG. 4. These updates are then processed by the catcher as it interacts with the calendar system 400 to retrieve and/or update calendar data 410, as discussed with reference to FIG. 4.

Figure 8:
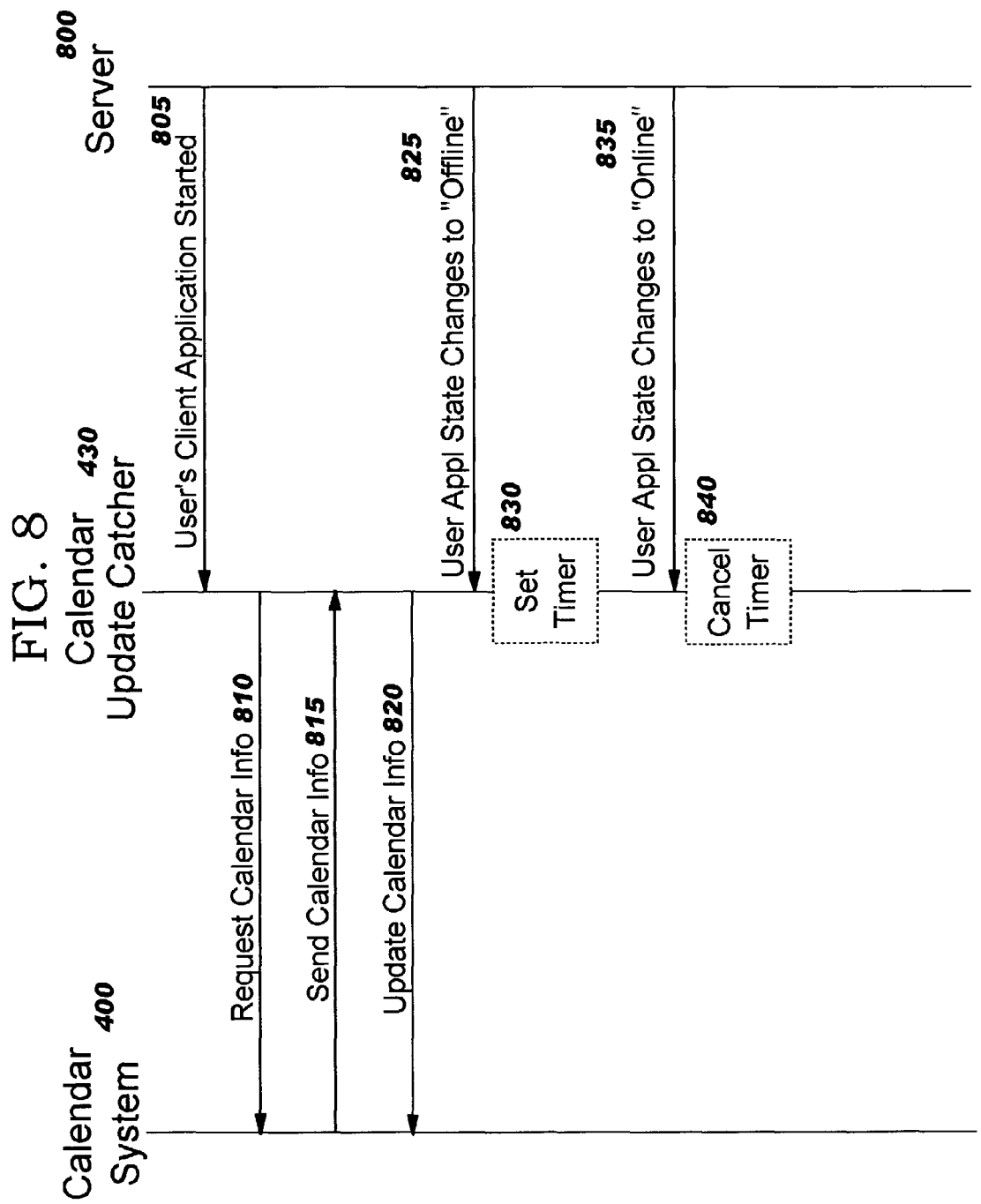
FIG. 8 depicts sample message flows occurring when an application signals status changes that are automatically made available for changing the working hours on the user's calendar and his calendar events, according to an embodiment of the present invention.

The sample message flows shown in FIG. 8 are similar to those in FIG. 5, but correspond to the application-initiated status changes of FIG. 7. For this example, it is presumed that the user is interacting with an application such as an IM client or e-mail client that maintains an awareness of status or user presence, and that the application has been defined as one of his designated applications. Alternative sources for user status updates include a cellular phone service, a pager service, and so forth. These suppliers of status information are represented generally at 800. Upon receiving a notification 805 that the application has been started (e.g., by the user invoking the application on his computer), the catcher 430 sends a message 810 to the calendar system 400, requesting this user's current calendar information. The calendar system sends that information 815, and the catcher makes updates as appropriate and returns the updated information 820 to the calendar system. Some time later, the user's state for the application changes to "offline" or a similar status, and an update of this change is transmitted at 825. The catcher may determine, based on rules that have been specified, that it is preferable not to immediately attempt to update the user's calendar in this situation. As an example, the IM client application might be configured to automatically change a user's status from "active" to "away" when no keystrokes have been detected from the user within a certain period of time. This change can be used to update the user's calendar, indicating (for example) that the user is not available. However, it might happen that the user is still available, and has only temporarily been doing something other than interacting with the keyboard of her computing device. In that scenario, changing the calendar would be unwarranted. To account for situations of this type, rules can be defined. An appropriate action in a rule might be to check the status in another application or to wait for 5 more minutes (or 15 minutes or some other time period), and if the user's state is still offline/away, to then proceed with updating the user's calendar. Accordingly, a timer is started in this example, as shown at 830. Assuming that another status change notification is received at 835 before the timer expires, the timer is cancelled 840 and the user's calendar is not actually updated. If the timer expires before the second notification 835 arrives, then the action(s) specified in the rule that set the timer are carried out.

Other techniques may be used to "validate" the application-initiated status changes, if desired, rather than applying rules. In particular, the user may receive a notification (for example, via a message on his pager, or by displaying a dialog box or other prompt), enabling him to choose whether to confirm or override the changes which the catcher has inferred for the user's calendar. In this approach, absence of a user response within a certain time period (which may be configurable) may be taken as confirmation of the change (or as rejection of the change, as specified, in preferred embodiments, by a rule).

As shown in FIGS. 4-8, the catcher operates by receiving input, obtaining information about a user's calendar, and then performing actions. The actions may include adding, deleting, or changing calendar events, as well as updating the user's working hours. Rules may be used in determining which action(s) to perform.

Suppose, for example, that the user presses the "End Working Hours" button before shutting off her computer and leaving the office at the end of the day. Using techniques of the present invention, the catcher may retrieve the user's current calendar data and determine that she has 45 minutes of "free time" remaining on today's schedule. In order to accurately reflect the user's status, this free time can be automatically removed by programmatically adjusting the user's working hours for this day to the current time. (Alternatively, it might be desirable to change, based on a rule, the block of free time to some type of "unavailable" status, rather than changing the working hours.) By automatically updating the user's calendar data, callers who receive a programmatically-generated message based on the user's calendar will correctly learn that this user is no longer available for receiving calls, and that if they choose to leave a voice mail message, the user might not receive it today. (According to related U.S. Pat. No. 6,988, 128, Ser. No. 09/670,844, users can set preferences to indicate that they check voice mail even when not in the office; these preferences are reflected in the programmatically-generated messages of the system disclosed therein.)

Suppose, for example, that the user has a three-hour meeting scheduled on her calendar for the current time. If she returns from the meeting after the first hour, she can press the "End Current Event" button to indicate that she is no longer busy. According to the present invention, the user's calendar data can be automatically updated to show the user's attendance at the meeting as having ended concurrently with pressing the button (that is, the duration of the "in a meeting" event is programmatically shortened). Thus, if someone needs to locate the user, he will not waste time or effort trying to find her in a meeting that she is no longer attending.

Similarly, if the user arrives at work early one day, and presses a "Start Working Hours" button on an update utility, the user's starting time can be programmatically changed to the current time of day (or, alternatively, the block of time extending to the user's normal starting time, as reflected by her active working hours profile, can be set to some type of "available" status). If, for example, the user arrives at work on an unscheduled work day and presses the "Start Working Hours" button, the system will set the user's starting time to the current time, and may also set the end working time to two hours from the current time (based on a default value or rule).

Figure 9:
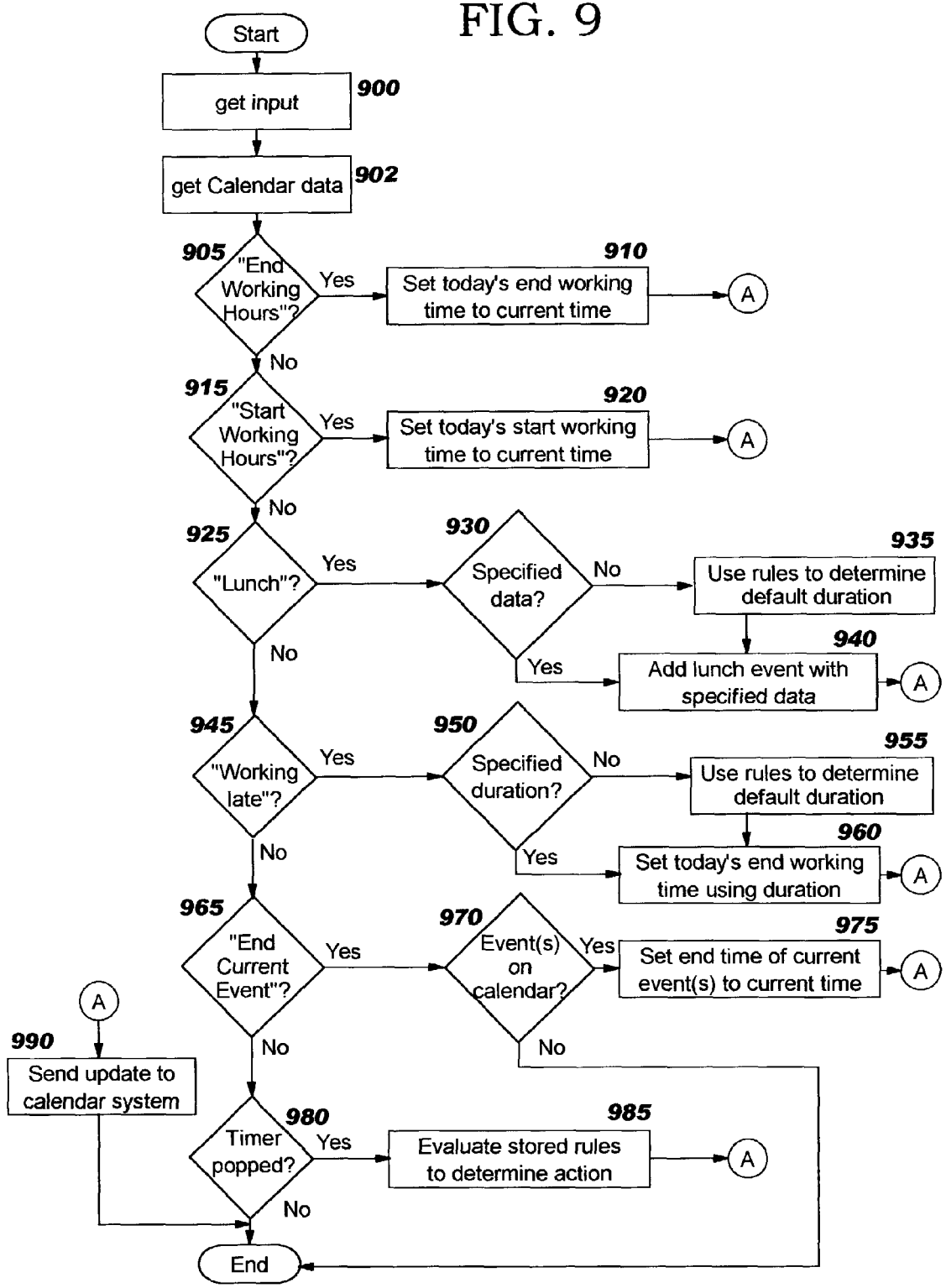
FIG. 9 provides a flowchart illustrating logic that may be used when implementing an embodiment of the present invention.

Referring now to FIG. 9, representative user-initiated status changes and logic that may be used to implement them will now be described. The status changes represented in the flowchart of FIG. 9 (which represents processing carried out in the catcher) are those shown on the display panel in FIG. 1.

The status update input and/or timer input (e.g., whether a timer has popped) are obtained (Block 900). It may also be necessary to retrieve some or all of the user's current calendar data (Block 902). (As shown in FIGS. 5 and 8, the catcher may have retrieved the user's calendar data from an earlier event. Or, the catcher may have obtained this calendar data by performing a periodic refresh of cached data, as discussed earlier.) Then, depending on the particular input type, the user's calendar data may be modified according to the remaining logic in FIG. 9.

The catcher may be implemented to apply the user's input directly, or to perform validation on the user's input to determine whether (and how) the input should be applied. For example, in the first approach, if the user presses a "Lunch" button, then the catcher adds a lunch event to the user's calendar, and the starting time of that lunch event is the current time. The second approach, on the other hand, may check to see what the user's currently-scheduled event is before adding the lunch event. If the user just pressed the "Lunch" button 2 minutes earlier, for example, then this second approach recognizes this apparent duplication/conflict. As another example, the user might press the "End Working Hours" button at 6 p.m. and again at 11 p.m., without having pressed the "Start Working Hours" in between. In this case, the user could be asked when the working hours started. If the start time was after 6 p.m., a new working hours interval could be placed on the calendar. Otherwise, the earlier working hours interval could be extended to 11 p.m.

A user might also use the "Start Working Hours" button and "End Working Hours" button to define an interval of time in which he is working outside of his normally-scheduled working hours. In this case, pressing these buttons causes an interval of actual working hours to be added for the user.

The type of validation performed for each input type may vary among implementations. The action taken to resolve apparent conflicts may also vary among implementations. A notification might be sent to the user, as one example, asking the user how to proceed. The logic in FIG. 9 corresponds to the first approach, but may be readily modified to incorporate the additional checking of the second approach. (Note that additional status information may be maintained when using the second approach, as necessary.)

Block 905 checks to see if the input represents an "End Working Hours" button being pressed. If so, then Block 910 sets the end of working hours for today to the current time, and control transfers to Block 990 where the updated information is sent to the calendar system for reflecting in the stored calendar data. If the test in Block 905 has a negative result, then Block 915 checks to see if the input is from a "Start Working Hours" button. As mentioned above, this input is appropriate when the user is arriving at work, and thus Block 920 sets the start time for today's working hours to the current time. This change is reflected on the calendar by transferring to Block 990.

Block 925 checks to see if the "Lunch" button was pressed to signal that the user is now leaving for lunch. If so, then Block 930 checks to see if data (e.g., a duration or an ending time, and optional information such as the lunch location) was specified. If not, then rules are preferably consulted to obtain the default lunch duration and any other relevant data (such as location), and thereby determine how long the user will be at lunch (Block 935). Otherwise, the specified lunch duration or ending time will be used. An example of why an ending time might be specified is as follows: the default lunch duration is 30 minutes, but the user has a meeting right after lunch, so the user specifies the start time of the meeting as the end time of the lunch event. A lunch event is then generated (Block 940) for the appropriate duration, and this event will be added to the user's calendar by invoking Block 990.

In Block 945, a test is made to see if the "Working late" button was pressed. If so, then Block 950 checks to see if a duration or ending time was specified. If not, then in preferred embodiments, a default duration is obtained from the rules and is used to compute the new ending time (Block 955). Otherwise, the ending time is determined from the specified duration or ending time. (If the user does not know the expected ending time, in order to avoid having to repeatedly update his working hours throughout the evening he might choose a very late ending time, such as midnight, and select "End Working Hours" when leaving.) In either case, Block 960 sets the ending time for today's working hours, and control transfers to Block 990.

Block 965 checks to see if an "End Current Event" button was pressed. This choice may be used to indicate a cancellation or early return from an event. Rather than requiring the user to manually bring up the calendar system and adjust the ending time of any events that are currently on his calendar, a simple mouse click on the "End Current Event" button performs these functions automatically. Thus, Block 970 checks to see if there are any events on the calendar. If so, then Block 975 sets the ending time of the current event(s) to the current time, and control then transfers to Block 990. (If there are no events scheduled, then the processing of FIG. 9 exits.)

Block 980 checks to see if a timer has popped. Timers are set according to rules, as discussed above with reference to the example scenario in FIG. 7. Data associated with the timer and/or rules are used (Block 985) to determine the appropriate next action(s).

The processing of FIG. 9 then ends for this iteration. As stated earlier, an implementation of the present invention might choose to provide users with different input choices, and the flowchart in FIG. 9 may be adapted accordingly. For example, a "Back in 1 hour" choice might be provided, or one or more "Back in . . . " buttons with configurable time intervals might be provided. For these examples, "busy" or "unavailable" events of the appropriate time length would be generated and added to the user's calendar. As another example, instead of or in addition to the choices described, an implementation may provide choices for other types of events such as "Teleconference" (i.e., attending a teleconference now), "DND", and so forth. For these events, the user may be allowed to specify a duration or end time, as well as optional additional information such as a location or subject (and this additional information may be passed to the calendar system for adding to a calendar event, as has been discussed). Or, rather than specifying a duration or ending time, a default duration may be determined from stored rules/preferences. Furthermore, the logic depicted in FIG. 9 is merely illustrative, and an implementation of the present invention may change this logic as deemed appropriate.

In the application-initiated input model discussed with reference to FIGS. 2, 7, and 8, representative inputs may include: logon; logoff or exit; change state to active; change state to DND; change state to away; change state to mobile; start (or stop) tracking billable hours; and any other change of state. While each of these inputs has a particular meaning in the context of the application that supports that input, embodiments of the present invention preferably use rules to determine how (or if) those inputs should be reflected on the user's calendar.

Use of rules with embodiments of the present invention will now be described in more detail. Rules may be used with either or both of the user-initiated changes and the application-initiated changes. Rules may also contain default values (e.g., a default duration for lunch). Examples of user-defined rules are:

1. If the user's instant messaging status changes to Do Not Disturb, place a Do Not Disturb event on the calendar for 1 hour.

2. When a person logs into his e-mail account in the morning, update his start working hour to the current time.

3. If the user logs off or exits his e-mail account, but the current time is within 5 minutes of his scheduled end time, do nothing. (For example, the user may feel that the overhead of updating the calendar is unjustified when only a relatively short time period is affected.)

4. If the user logs off or exits one of his designated applications during his working hours, but not within 15 minutes of his ending time, then start a 10-minute "watch for logon" timer to see if the user logs back on.

5. If a "watch for logon" timer pops, then the user is not available.

6. If the user updates her IM status to away, then put a meeting on the user's calendar after querying the user for a duration.

7. If the user's IM status is updated to away due to absence of keyboard activity, then put a meeting on the user's calendar and use a default duration of 30 minutes.

8. If the user's IM status changes to active (due to presence of keyboard activity or a user input), then prompt the user to determine whether another currently-scheduled event should be cancelled or changed to have an early ending time.

In some cases, the programmatically-generated events that result from operation of the present invention can be identified with information that is meaningful for the users. For example, IM systems typically allow users to specify a text string with their status, such as "working on a customer problem" when the status is DND. Optionally, this additional status information may be captured and used by the present invention. Thus, rather than entering just a "DND" event on the user's calendar when Rule 1 applies, the "working on a customer problem" text can be included with that event to provide additional useful information.

Referring now to the sample GUI panels in FIGS. 10-13, techniques for configuring an implementation of the present invention will now be described. FIG. 10 illustrates a profile management panel 1000 that may be used to identify a set of working hours and optional preferences for those working hours. In this example, the user has selected to view/update the profile named "Profile 1". Four additional profiles are also available for this user, as shown by the tabs at 1010. As shown generally at 1020, the user may be provided with check boxes and entry fields with which the days of the week and hours of the day can be specified for this profile. The user also preferably specifies the time zone to be used for this profile (see element 1030). One or more preferences 1040 may be specified for this profile as well. In the example, preferences are specified as name/value pairs, and this user has specified that she has a pager with the phone number "555-1212". This panel 1000 also allows the user to specify whether this profile is her current default profile, using a check box 1050 or similar means. After pressing the OK button (see element 1060), the system updates the user's stored information. (Refer to the earlier discussion of how profiles are used to update working hours for more information.)

Figure 11:
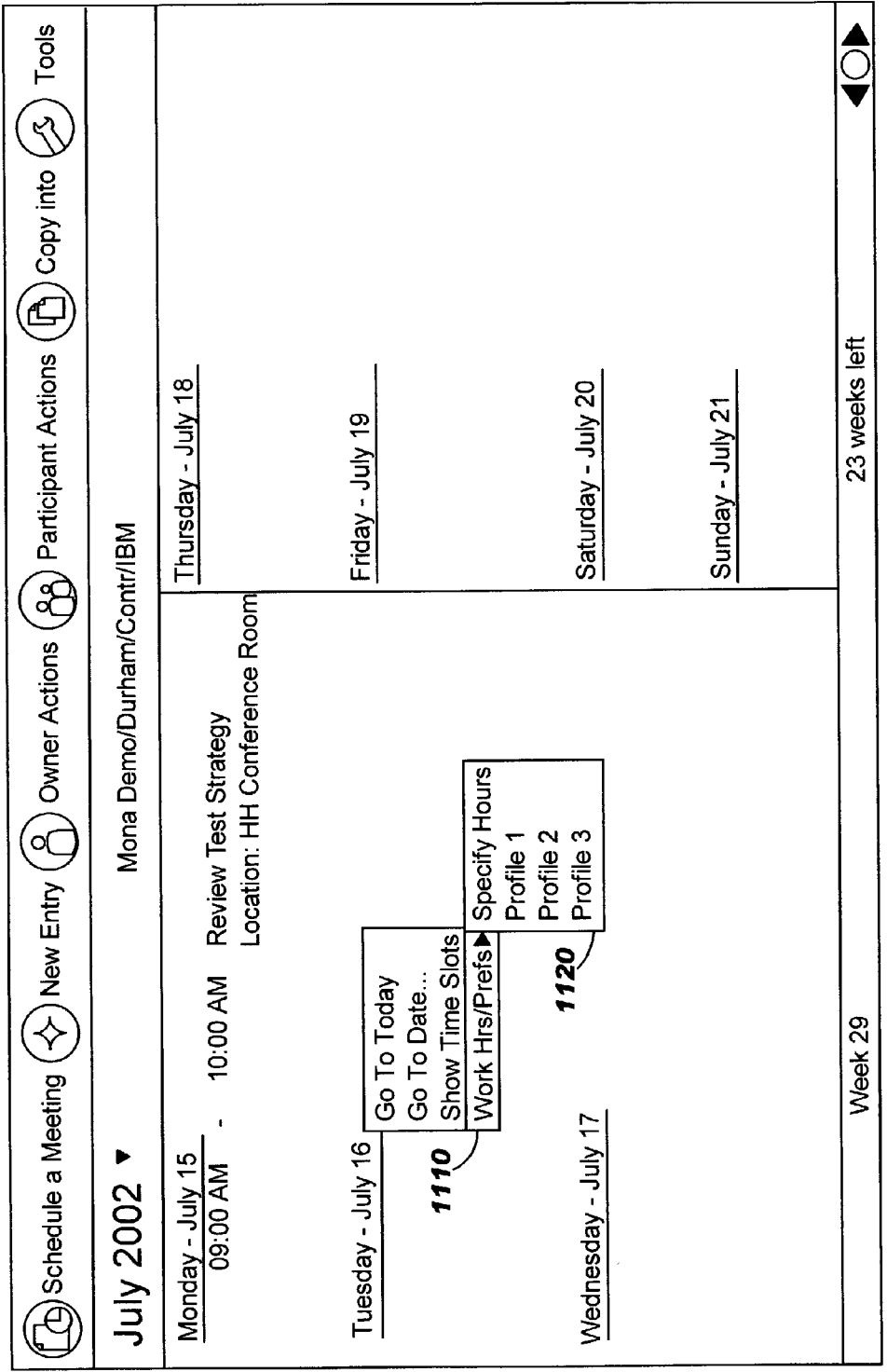

FIG. 11 illustrates a sample view 1100 of a user's calendar, according to an embodiment of the present invention. From this view, the working hours for an individual day or for a range of dates may be explicitly overridden or changed. Preferably, the user activates a selection menu, for example by right-clicking in the calendar area. In the example, selection menu 1110 then pops up. An option to change working hours or preferences is provided on this menu, and when the user selects this option, another selection menu 1120 pops up. Selection menu 1120 contains choices that enable the user to specify different working hours and preferences for the selected day, or to select a profile from among the displayed choices. Suppose that the user selects "Specify Hours". A working hours and preferences panel 1200, shown as the example in FIG. 12, is then displayed. This panel can be used to change working hours and/or preferences information, without defining a new profile. Since the user selected a single date, July 16th, on the calendar, the system displays the panel with the "From:" date 1230 and the "To:" date 1240 set to 07/16/2002, indicating the date (or dates) for which working hours and preferences are being specified. Check boxes may be provided, as shown in this example, and will be checked for the corresponding days. Thus, the check box for "Tuesday", as shown at 1210, is checked (since the user selected Jul. 16, 2002, which is a Tuesday). The user then enters working hours of 8 a.m. to 2 p.m. for this day, and in the example also defines a preference for using a cell phone with phone number "123-4567" (see 1220). Note that this panel 1200 also includes a check box 1250 where the user may indicate that she wishes to override any current preferences. This box has not been checked in the example, and therefore the pager information defined in Profile 1 (which is the default profile and is currently in effect) will remain available.

With reference to FIG. 12, if the user wants to specify working hours and preferences for a range of dates, he simply updates the "From:" and "To:" fields with the desired starting and ending dates, selects the check boxes for those days that will have working hours (e.g., Wednesday, Friday), and enters the working hours for each of the selected days. Alternatively, if the calendar supports the selection of a date range (for example, on FIG. 11), then this information can be used to initially set the From/To dates.

In FIG. 11, if the user had selected July 16th (for example, by right-clicking in the calendar area for that day) and had then selected "Profile 2" from selection menu 1120 (or one of the other displayed profile choices), rather than "Specify Hours", preferred embodiments cause information specified in the selected profile to be applied to the selected day. Prior to actually applying the profile, the system preferably prompts the user with a pop-up window showing the From/To dates to which this profile will be applied The user is then able to proceed with the update, cancel the update or change the From/To dates—giving the user the ability to specify that this profile is to be used for a range of dates or for an alternate date. In this example, if the user opted to proceed with the update to July 16th, and this date is in the future, then the name of the profile is stored. If the date is in the past, the profile's specified working hours for Tuesdays would be applied to Tuesday, July 16th, along with any preferences from that profile.

Figure 13:
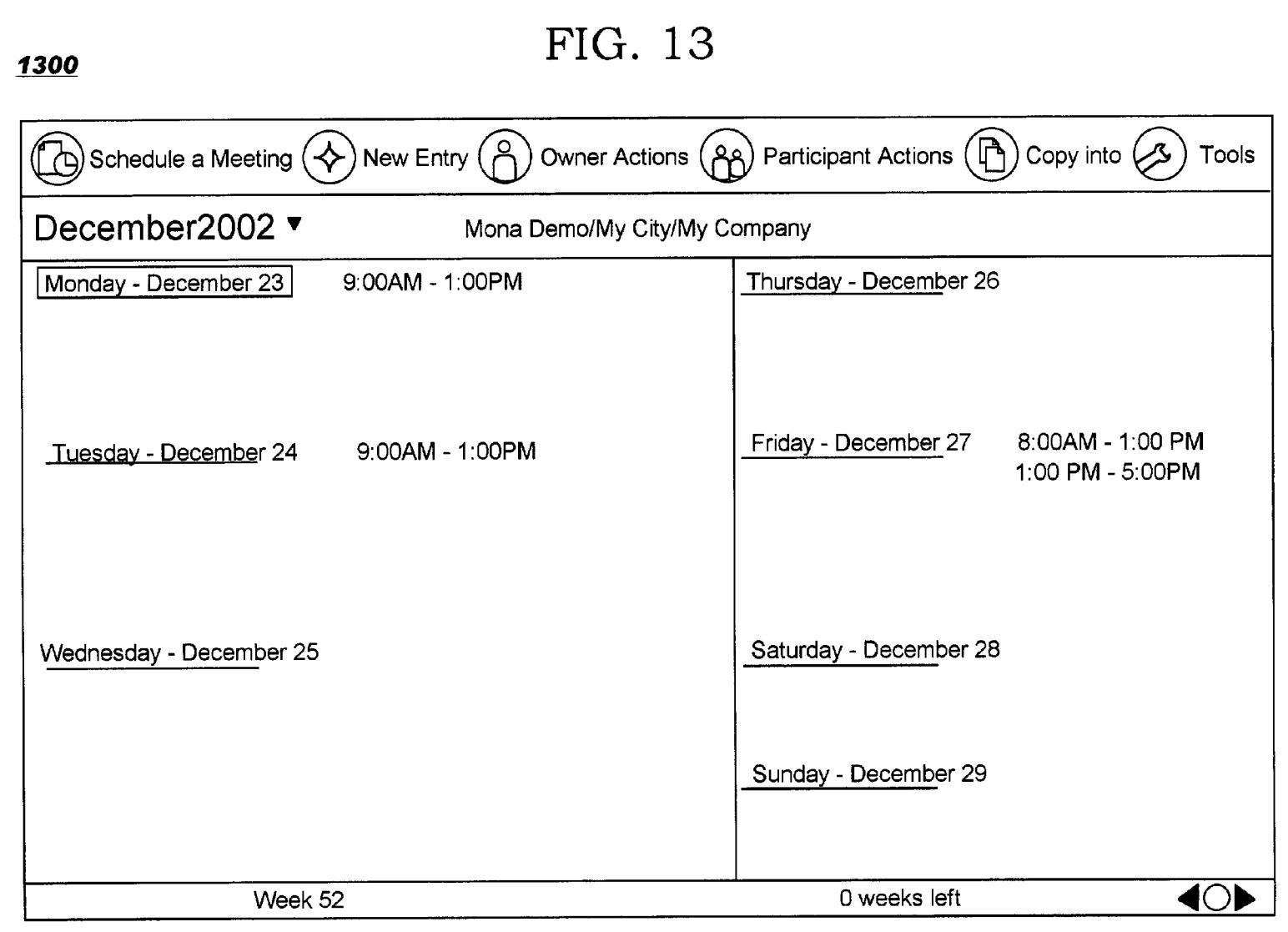

FIG. 13 shows a calendar view 1300 illustrating how per-day variations in scheduled working hours might be displayed to users. In this example, the user is scheduled to work from 9 a.m. until 1 p.m. on Monday and Tuesday, has no scheduled hours shown on Wednesday or Thursday (or Saturday or Sunday), and is scheduled to work from 8 a.m. to 5 p.m. on Friday. This gives people looking at the calendar a quick overview of the calendar owner's work day.

Prior art calendar views typically show non-working hours as shaded, to indicate that the calendar owner is not available during that time. When using the present invention, different colors may optionally be used to differentiate regular working hours from working hours that apply only for that date. For example, non-working hours could be gray, extended working hours could be light blue, reduced working hours could be dark gray, and regular working hours could be white. Thus, a person viewing Joe's calendar can quickly see that Joe may be working late today, but that this is not his typical schedule. Instead of or in addition to using colors to represent working hours, other visual cues such as different icons or hash marks could be used. Alternatively, only the calendar owner might be allowed to see the differences in normal working hours versus updated working hours, and others would only see working hours and non-working hours.

As has been demonstrated, the present invention discloses advantageous techniques for keeping working hours and calendar entries up-to-date on electronic calendars. Working hours can be specified for particular days or ranges of days. Preferences can be associated with working hours. Multiple working hours profiles can be defined, giving users the ability to quickly choose which working hours are applicable. More accurate data will be reflected on users' calendars, enabling events to be scheduled accurately and allowing other users to more accurately determine where the calendar owner is and his availability at a point in time. Additionally, calendar-based tools (such as those disclosed in the related U.S. patents for responding to incoming events such as voice mail and for using calendar events to update status in other applications), vacation planners, and so forth will have more accurate calendar data with which to work. In addition, by supporting variable working hours, historical data can be maintained accurately even though a user's scheduled working hours change, and any analyses performed using this historical data can then take advantage of information that is more accurate.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-readable storage media (including, but not limited to, disk storage, CD-ROM, optical storage, and so forth) having computer-readable program code embodied therein.

The present invention has been described with reference to flowchart illustrations and/or flow diagrams of methods, apparatus (systems), and computer program products according to embodiments of the invention. It will be understood that each block of the flowchart illustrations and/or flow diagrams, and combinations of blocks in the flowchart illustrations and/or flows in the flow diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or flow diagram block(s) or flow(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or flow diagram block(s) or flow(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart and/or flow diagram block(s) or flow(s). Furthermore, the instructions may be executed by more than one computer or data processing apparatus.

While preferred embodiments of the present invention have been described, additional variations and modifications in those embodiments may occur to those skilled in the art once they learn of the basic inventive concepts. Therefore, it is intended that the appended claims shall be construed to include all such variations and modifications as fall within the spirit and scope of the invention.

What is claimed:

1. A computer-implemented method of keeping scheduled working hours up-to-date for a user's electronic calendar, comprising:
   receiving, for an electronic calendar application that provides an electronic calendar for a calendar user, a notification from a status-aware application, wherein:
      the status-aware application is a non-calendar application;
      the notification indicates a current status of the user as detected by the status-aware application;
      the notification is sent from the status-aware application upon the status-aware application detecting that the user has started his work day; and
      the current status as indicated by the notification comprises the user starting his work day; and
   upon programmatically determining, from the received notification, that the current status of the user as detected by the status-aware application conflicts with scheduled working hours currently on the user's electronic calendar, programmatically modifying the user's currently-scheduled working hours on the user's electronic calendar, responsive to the receiving, such that the user's electronic calendar also reflects the current status of the user, wherein the programmatic modification comprises changing the user's scheduled starting work hour to coincide with a time at which the notification is received.

2. A computer-implemented method of keeping scheduled working hours up-to-date for a user's electronic calendar, comprising:
   receiving, for an electronic calendar application that provides an electronic calendar for a calendar user, a notification from a status-aware application, wherein:
      the status-aware application is a non-calendar application;
      the notification indicates a current status of the user as detected by the status-aware application;
      the notification is sent from the status-aware application upon the status-aware application detecting that the user has ended his work day; and
      the current status as indicated by the notification comprises the user ending his work day; and
   upon programmatically determining, from the received notification, that the current status of the user as detected by the status-aware application conflicts with scheduled working hours currently on the user's electronic calendar, programmatically modifying the user's currently-scheduled working hours on the user's electronic calendar, responsive to the receiving, such that the user's electronic calendar also reflects the current status of the user, wherein the programmatic modification comprises changing the user's scheduled ending work hour to coincide with a time at which the notification is received.

3. A computer-implemented method of keeping scheduled working hours up-to-date for a user's electronic calendar, comprising:
   receiving, for an electronic calendar application that provides an electronic calendar for a calendar user, a notification from a status-aware application, wherein:
      the status-aware application is an instant messaging application; and
      the notification indicates a current status of the user as detected by the status-aware application; and
   upon programmatically determining, from the received notification, that the current status of the user as detected by the status-aware application conflicts with scheduled working hours currently on the user's electronic calendar, programmatically modifying the user's currently-scheduled working hours on the user's electronic calendar, responsive to the receiving, such that the user's electronic calendar also reflects the current status of the user, wherein:
      the instant messaging application sends one notification for the electronic calendar application when a user of the instant messaging application begins using the instant messaging application and the programmatically modifying then sets the starting work hour of the user, on the user's electronic calendar, to match a time of receipt of the notification; and
      the instant messaging application sends another notification for the electronic calendar application when the user of the instant messaging application stops using the instant messaging application and the programmatically modifying then sets the ending work hour of the user, on the user's electronic calendar, to match a time of receipt of the notification.

4. A computer-implemented method of keeping scheduled working hours up-to-date for a user's electronic calendar, comprising:
   receiving, for an electronic calendar application that provides an electronic calendar for a calendar user, a notification from a status-aware application, wherein:
      the status-aware application is an e-mail application; and
      the notification indicates a current status of the user as detected by the status-aware application; and upon programmatically determining, from the received notification, that the current status of the user as detected by the status-aware application conflicts with scheduled working hours currently on the user's electronic calendar, programmatically modifying the user's currently-scheduled working hours on the user's electronic calendar, responsive to the receiving, such that the user's electronic calendar also reflects the current status of the user, wherein:

the e-mail application sends one notification for the electronic calendar application when a user of the e-mail application begins using the e-mail application and the programmatically modifying then sets the starting work hour of the user, on the user's electronic calendar, to match a time of receipt of the notification; and the e-mail application sends another notification for the electronic calendar application when the user of the e-mail application stops using the e-mail application and the programmatically modifying then sets the ending work hour of the user, on the user's electronic calendar, to match a time of receipt of the notification.

5. A computer-implemented method of keeping scheduled working hours up-to-date for a user's electronic calendar, comprising:

receiving, for an electronic calendar application that provides an electronic calendar for a calendar user, a notification from a status-aware application, wherein:

the status-aware application is a portal page application; and the notification indicates a current status of the user as detected by the status-aware application; and upon programmatically determining, from the received notification, that the current status of the user as detected by the status-aware application conflicts with scheduled working hours currently on the user's electronic calendar, programmatically modifying the user's currently-scheduled working hours on the user's electronic calendar, responsive to the receiving, such that the user's electronic calendar also reflects the current status of the user, wherein:

the portal page application sends one notification for the electronic calendar application when a user of the portal page application begins using the portal page application and the programmatically modifying then sets the starting work hour of the user, on the user's electronic calendar, to match a time of receipt of the notification; and the portal page application sends another notification for the electronic calendar application when the user of the portal page application stops using the portal page application and the programmatically modifying then sets the ending work hour of the user, on the user's electronic calendar, to match a time of receipt of the notification.

* * * * *